US011816687B2

(12) United States Patent
Liu et al.

(10) Patent No.: US 11,816,687 B2
(45) Date of Patent: Nov. 14, 2023

(54) PERSONALIZED APPROACH TO MODELING USERS OF A SYSTEM AND/OR SERVICE

(71) Applicant: INTUIT INC., Mountain View, CA (US)

(72) Inventors: Juan Liu, Mountain View, CA (US); Ying Yang, Mountain View, CA (US); Amrita Damani, Mountain View, CA (US); David Joseph Antestenis, Mountain View, CA (US); Aaron Dibner-Dunlap, Mountain View, CA (US); Grace Wu, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 261 days.

(21) Appl. No.: 16/916,915

(22) Filed: Jun. 30, 2020

(65) Prior Publication Data

US 2021/0406743 A1 Dec. 30, 2021

(51) Int. Cl.
*G06Q 30/0202* (2023.01)
*G06N 20/20* (2019.01)
*G06N 5/04* (2023.01)
*G06N 7/01* (2023.01)
*G06N 5/01* (2023.01)

(52) U.S. Cl.
CPC ......... *G06Q 30/0202* (2013.01); *G06N 20/20* (2019.01); *G06N 5/01* (2023.01); *G06N 5/04* (2013.01); *G06N 7/01* (2023.01)

(58) Field of Classification Search
CPC ........ G06N 7/005; G06N 20/20; G06N 5/003; G06N 5/04; G06N 7/01; G06N 5/01; G06Q 30/0202
USPC ......................................................... 706/11
See application file for complete search history.

(56) References Cited

U.S. PATENT DOCUMENTS

| | | | | |
|---|---|---|---|---|
| 2020/0167798 A1* | 5/2020 | Lee | ................ | G06N 20/20 |
| 2021/0241292 A1* | 8/2021 | Pandey | ................ | G06N 3/08 |

OTHER PUBLICATIONS

Cheever, State Space Representations of Linear Physical Systems (captured Mar. 2019), available at https://web.archive.org/web/20190303215150/https://lpsa.swarthmore.edu/Representations/SysRepSS.html (Year: 2019).*

* cited by examiner

*Primary Examiner* — Charles Guiliano
(74) *Attorney, Agent, or Firm* — DLA PIPER LLP (US)

(57) ABSTRACT

Dynamic state-space modeling within a special purpose hardware platform to determine non-conversion risks for each trial user and churn risks for each active subscriber having exhibited a sequence of behaviors. The state-space model may be operable to determine a loss risk for each of a provider's active trial users and/or subscribers.

15 Claims, 9 Drawing Sheets

PERSONALIZED APPROACH TO MODELING USERS OF A SYSTEM AND/OR SERVICE

BACKGROUND

Delivery and licensing models such as Software as a Service (SaaS), Platform as a Service (PaaS), Infrastructures as a Service (IaaS), other similar on-demand software such as subscription-based models, etc. have increasingly gained popularity, especially in business software applications. With these models, users may access the provided services using a client (e.g., a thin client) via web browsers or mobile applications on mobile computing devices. More such models have been implemented under the end-to-end computer networking architecture where features or services reside in the end nodes of the computer network, while the users reside on the other end of the computer network. An end-to-end computer networking architecture addresses the shortcomings of conventional software delivery and licensing models because the provided services and applications may need to be modified, and new features, applications, or services may be added to the provided services. Each modification or addition of the provided services incurs costs. Yet users might have trouble discovering aspects of the provided services that will meet their needs without some assistance, especially if those features are located deep within the provided services.

With high penetration rates and many services nearing commoditization, many service providers have recognized that it is more important than ever to find new ways to bring the full breadth and unique value of the provided services to their users. These providers are seeking new solutions to help them more effectively up-sell and/or cross-sell their products, services, content, and applications; successfully launch new products; and create value in new business models.

Many of these activities have been directed towards users who are new to the marketplace as well as convincing competitor's subscribers to switch services. While these activities have been successful in terms of obtaining new users, it is becoming more apparent that other providers are also doing similar activities. Thus, while some users may be switching to one provider's products and services, other users may be dropping that provider's product and services. Since the cost of acquiring a new customer (or winning back an old customer) is high, user conversion or subscriber churn can be a major expense for a service provider. The ability to identify and intervene with users who are likely to leave, or otherwise stop using products or services, can have a significant impact on a provider's bottom line. Thus, it is with respect to these considerations and others that the present disclosure has been made.

DETAILED DESCRIPTION

Figure 1:
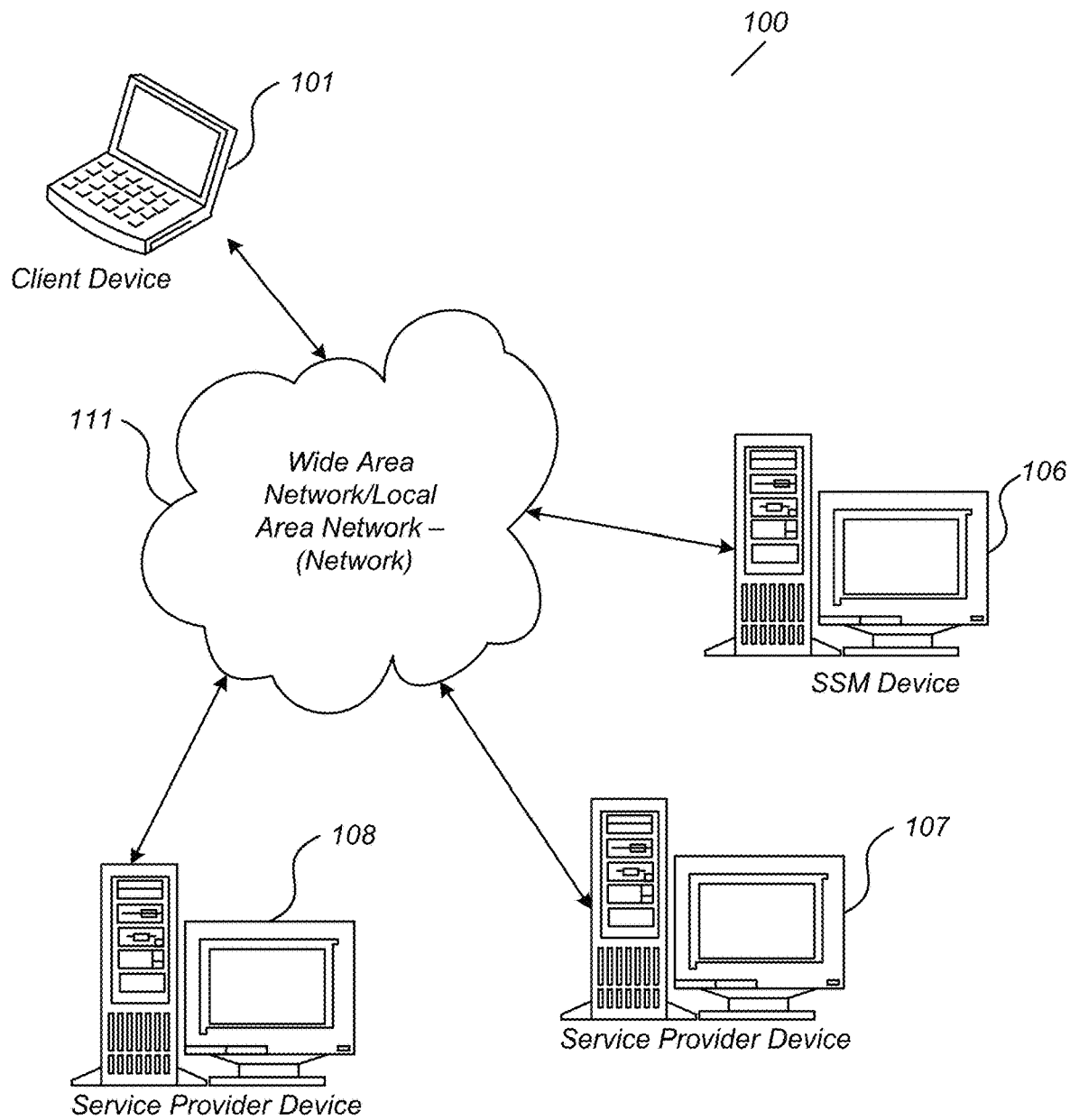
FIG. 1 illustrates an example server provider (SP) system in which certain examples of the present disclosure may be implemented.

Examples described herein are configured to perform dynamic state-spacing modeling within a special purpose hardware platform to determine non-conversion risks for each trial user and churn risks for each active subscriber having exhibited a sequence of behaviors. As discussed further below, the state-space model may be operable to determine a loss risk for each of a provider's active trial users and/or subscribers (collectively referred to as "users"). The examples address a computer-centric and Internet-centric problem of a service provider operating a platform with a system management to convert trial users and lower churn of subscribers, and further increase product engagement. The platform may include any of the following: a Software as a Service (SaaS), a Platform as a Service (PaaS), or an Infrastructures as a Service (IaaS) provided by the service provider for the engagement of a user.

The disclosed methods and system may be implemented as computer programs or application software on one or more computing devices that process user features collected by a data management system.

The state-space model identifies complex behavioral patterns that are consistent with subscribers who have churned and or trial users who have not converted within a defined past. The model may do so in a tailored way for distinct segments of an overall user base. The state-space model does not simply identify broad based behavioral trends; instead, the state-space model allows for a personalized assessment of a current user. For example, a user is not treated as a member of a large class (e.g., business owner in the New York region), but as an individual who has exhibited a precise sequence of behaviors within a predefined time period.

Thus, the state-space model makes use of sequential behavior rather than a traditional aggregate approach. That is, the sequential nature of events is an inherent part of the state-space model, rather than an ad hoc approximation. The disclosed state-space model may also take advantage of (potentially static) contextual data to improve performance by segmenting users and building individual behavioral models for each segment. Thus, taken together, the present disclosure is directed towards a novel personalized approach to modeling users of a system and or service.

Churn indicates any subscriber who has completely stopped using the service and is unlikely to return—a subscriber lost, does not renew their subscription base membership in the next billing cycle, or cancels their subscription base membership. The present disclosure is directed towards predicting whether a subscriber is likely to churn, but, has not yet stopped using the product or service. In some examples, a machine learning system is able to assess a subscriber at the point of him/her stopping use of the platform or service and assign a propensity score. In some examples, "churn" is defined as a curtailed usage of activity with the platform. In alternative examples, a machine learning system is operable to assess a subscriber prior to his/her stopping use of the platform or service and assigns a propensity score. In some examples, "churn" is defined herein as a reduction in activity. The specific definition of what constitutes "reduction" may vary between service provider, reflecting the provider's own policies, since these have direct impact on subscriber behavior and decision making.

Conversion is distinct from churn. Conversion or non-conversion can be measured with respect to conversion optimization, or conversion rate optimization (CRO). CRO is a system for increasing the percentage of trial users that convert into subscribers, or more generally, take any desired action on platform interface. In some examples, "non-conversion" is defined as a failure to convert the trial user to a subscriber. In alternative examples, a machine learning system is operable to assess a trial user prior to his/her stopping use of the platform or service, and/or before the end of the trial period, and potentially retain the trial user. The definition of conversion implemented herein may be a weaker one than some service provider's definition (in the sense that it is a more general definition that might typically be used by a provider). Instead, non-conversion is defined as a reduction in activity or an identification of a specific activity. Non-conversion is not the same as churn, although both are generalized herein as a loss risk.

In accordance with the disclosed principles, users are not simply assigned to a large class and associated with a user behavior of that class, rather, each user's individual context and behavior is assessed by the state-space model to determine a score signaling the likelihood of risk loss (e.g., that a subscriber will churn or a trial user will not convert). The state-space model may further employ dynamic daily-reporting features to construct the behavioral sequence of an individual user. In contrast to other approaches that might make use of only static (or slowly changing) features of the network, such as the reported income of a user, the disclosed state-space model may also use dynamic features such as e.g., a sequence of daily activity with the platform.

In some examples, a conversion/churn index is a feature that can be incorporated into automated monitoring of the performance of contextual marketing systems or its components. The conversion/churn index may also be available to human marketers and data scientists who might want to interact with the system. However, it should be understood that some examples operate automatically, absent such human interactions.

There are several advantages of the disclosed examples. For example, using a series of real time models as opposed to a single unified model allows precise separation of signals within discrete chunks of time. It also means that users who cancel or subscribe to the model early ("drop out") can be appropriately removed from the samples for the graduated models, so they do not provide false signals because the applicability to their case has expired. Thus, a fine-tuning model applicable within discrete time windows is an objective of the present disclosure. This objective could be achieved via other methods, e.g., deep learning; but creating separate models is more computationally efficient than training a neural network of sufficient scope to achieve this task.

It is noted that while examples herein disclose applications to SaaS, PaaS, or IaaS users, where the users are different from the service providers, other intermediate entities may also benefit from the principles disclosed herein. For example, the examples disclosed herein may be applied to banking industries, cable television industries, retailers, wholesalers, or virtually any other industry in which that industry's customers interact with the services and/or products offered by an entity within that industry.

FIG. 1 illustrates an example server provider (SP) system 100 in which certain examples of the present disclosure may be implemented. The example SP system 100 includes a network 111, client device 101, state-space modeling (SSM) device 106, and service provider devices 107-108.

The network 111 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, enabling messages to be sent from one LAN to another. Furthermore, remote computers and other related electronic devices could be remotely connected to either LANs or WANs via a modem and temporary telephone link. Network 111 includes any communication method by which information may travel between computing devices.

The client device 101 may include virtually any computing device that typically connects using a wired communications medium such as telephones, televisions, video recorders, cable boxes, gaming consoles, personal computers, multiprocessor systems, microprocessor-based or programmable consumer electronics, network PCs, or the like. The client device 101 may further be configured to include a client application that enables the user to log into a user account that may be managed by the service provider. Information provided either as part of user account generation, user account utilization, and or other activity may result in providing various user profile information. Such user profile information may include, but is not limited to, type of user and/or behavioral information about the user. For example, the user might be determined to be a trial user, who is less than twenty-eight days into a trial membership of a specific platform. The user profile is subsequently used to predict the likelihood of the trial user to convert to a subscriber. In some examples, the user profile information includes identification information of users who have subscribed to a specific platform but are in the first three months of their subscription. The user profile is subsequently used to predict the likelihood of the user to churn.

The SSM device 106 may include virtually any network computing device that is specially configured to determine non-conversion/churn risks for each user having exhibited a sequence of behaviors. Devices that may operate as SSM device 106 include, but are not limited to, personal computers, desktop computers, multiprocessor systems, microprocessor-based or programmable consumer electronics, network PCs, servers, network appliances, and the like.

Although SSM device 106 is illustrated as a distinct network device, the disclosed principles are not so limited. For example, a plurality of network devices may be configured to perform the operational aspects of SSM device 106. For example, data collection might be performed by one or more set of network devices, while processing the collected data to determine the non-conversion/churn risks (collectively referred to as "loss risk") may be performed by one or more other network devices.

Service provider devices 107-108 may include virtually any network computing device that is configured to provide to SSM device 106 information including product usage characteristic information, user information, and/or other context information, including, for example, the number of bank accounts the user has added, the number of trips the user has reviewed, the ratio of business trips to personal trips, etc. In some examples, service provider devices 107-108 may provide various interfaces including, but not limited to, those described in more detail below in conjunction with FIG. 2.

Figure 2:
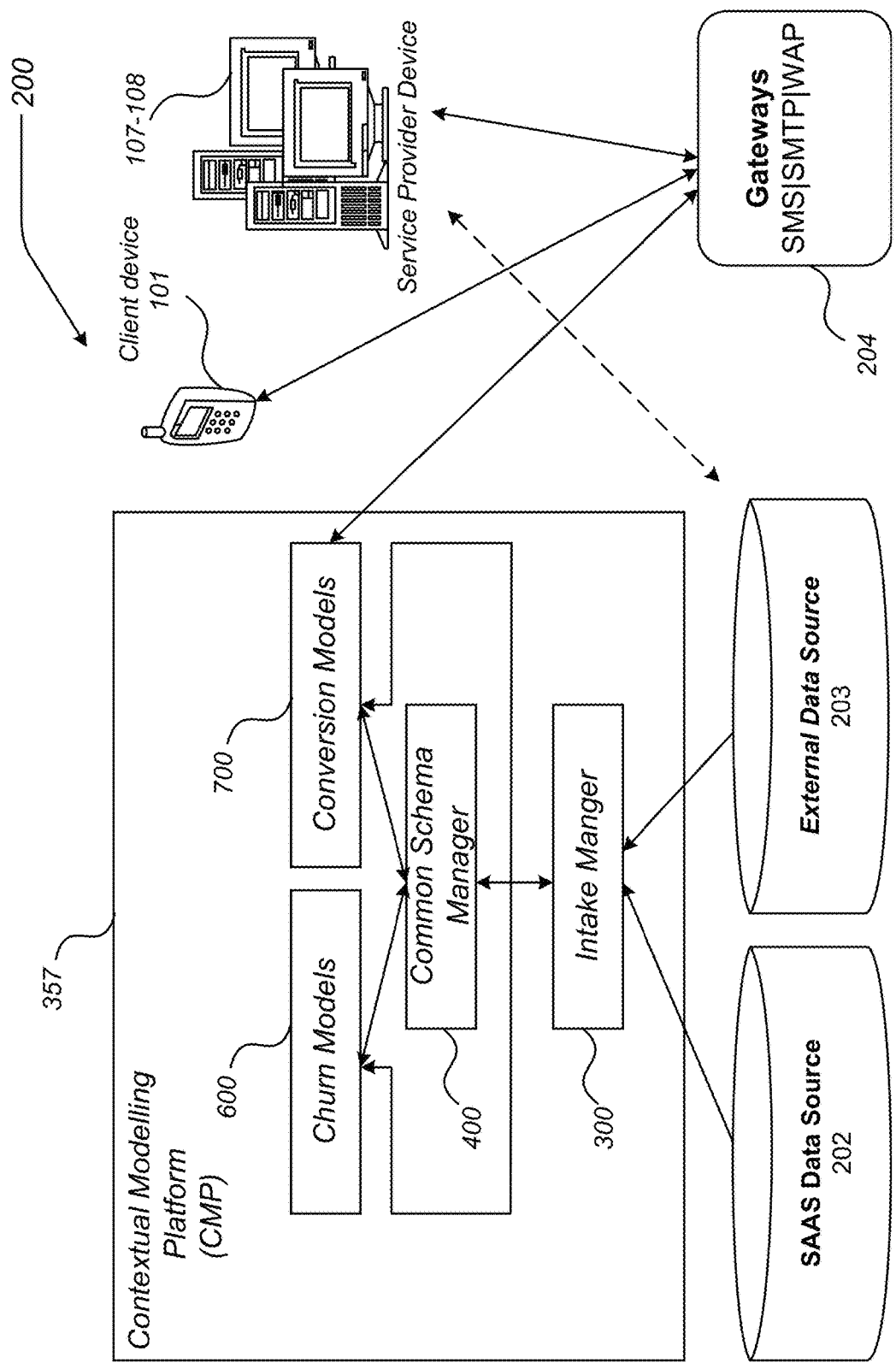
FIG. 2 shows one example architecture that may be useable to determine a score signaling the likelihood that a user will not convert and/or churn, in accordance with an example of the disclosure.

FIG. 2 shows one example architecture 200 that may be used to determine a score indicating the likelihood that a user will not convert and/or churn in accordance with the disclosed principles. Architecture 200 of FIG. 2 may include many more components than those shown. The components shown, however, are sufficient to disclose an illustrative example for practicing the disclosed principles. Architecture 200 may be deployed across components of FIG. 1, including, for example, the SSM device 106, the client device 101, and/or the service provider devices 107-108.

The architecture 200 includes a contextual modelling platform (CMP) 357, a SaaS data source 202 (e.g., data repository), and an external data source 203. The contextual modelling platform 357 includes Churn Models 600 and Conversion Models 700. Briefly, the Churn Models 600 are employed to determine churn risk of each subscriber. Similarly, the Conversion Models 700 are employed to determine non-conversion risk of each trial user.

Not all the components shown in FIG. 2 may be required to practice the examples disclosed herein and variations in the arrangement and type of the components may be made without departing from the spirit or scope of the subject disclosure. As shown, however, architecture 200 further includes communication channel or communication channels 204 and client device 101.

SaaS data source 202 may be implemented within one or more service provider devices 107-108 of FIG. 1. The SaaS data source 202 may be configured to store such historical data as a customer's profile, including their billing history, platform subscriptions, feature information, content purchases, client device characteristics, and the like. SaaS data source 202 may store various historical data as well as current data including but not limited to product and/or service use behaviors, and the like. SaaS data source 202 may also provide information about a time when such communications occur, as well as a physical location for which a user might be connected to during a communication.

The CMP 357 may also receive data from external data source 203.

External data source 203 may include virtually any mechanism usable for storing and managing data including, but not limited to, files stored on a disk or other computer readable medium, an application, such as a database or spreadsheet, a web service, or the like. External data source 203 may provide, but is not limited to providing, publicly available information about a user, including identifiers, demographic information, or the like. In addition to data generated by or relating to a specific user, external data source 203 may also provide contextual information that is broadly applicable to a wide range of users, such as, but not limited to, a schedule of events relevant to a geographic area, or the like.

CMP 357 is streamlined to quickly receive and process the incoming data through various data cycles. For example, the CMP 357 may generate a non-conversion/churn prediction from sixteen different machine learning frameworks dynamically based on the user's lifetime in the platform. As the raw data is processed into state vectors of attributes, treatment eligibilities, ranking models, distribution data, and other supporting data, the raw data, and/or results of the processing of the raw data may be stored for later use. Each of the sixteen models is suitable for users who have stayed with the platform for different length of time.

For example, if user 'A' signed up for one day, model 1 may be used to predict his/her likelihood to convert (e.g., a propensity score). As user 'A' grows 'colder' the next day, he/she will "graduate" from model 1 to receive a propensity score generated by model 2. At each single day, only the most real time model will be applied to generate the prediction score. In one or more examples, CMP 357 is capable of analyzing data that may not appear in a common set, but appears in a particular case, so that unanticipated actions or results may also be employed and used to further adapt the system. CMP 357 may also be capable of analyzing historic data so that unanticipated insights may also be employed and used to further adapt the system.

Communication channels 204 may include one or more components that are configured to enable network devices to deliver and receive interactive communications with one or more users. In one example, communication channels 204 may be implemented within one or more of service provider devices 107-108, client device 101 and/or within networks 111 of FIG. 1.

CMP 357 is configured to receive customer data from SaaS data source 202. CMP 357 may then employ intake manager 300 to parse and/or store the incoming data. One example of intake manager 300 is described in more detail below in conjunction with FIG. 3. The data may then be provided to common schema manager 400, which may compute various additional attributes, manage updates to state vectors for entities (users) within the system, and to further map raw data into a common schema. The common schema data may then be used to support a number of models, including Churn Models 600 and Conversion Models 700. Churn Models 600 are configured to generate subscriber churn scores and indices that are then provided to common schema manager 400 to become part of the common schema data. Similarly, Conversion Models 700 are configured to generate trial users' conversion scores and indices that are then provided to common schema manager 400 to become part of the common schema data.

In some instances, it may also be possible to provide the raw data directly to the models, for example, to the Churn Models 600 or the Conversion Models 700. This may be desirable when provider specific data that is not captured by the common schema nevertheless proves to be of high value for Churn Models 600 or the Conversion Models 700 or is otherwise useful in the operation of the CMP 357. This is discussed in greater detail below with respect to FIG. 4.

It should be noted that the components shown in CMP 357 of FIG. 2 are configured to execute as multiple asynchronous and independent processes, coordinated through an interchange of data at various points within the process. As such, it should be understood that managers 300 and 400 may operate within separate network devices, such as multiple network devices, within the same network device within separate CPUs, within a cluster computing architecture, a master/slave architecture, or the like. In at least one example, the selected computing architecture may be specially configured to optimize a performance of the manager executing within it. Moreover, it should be noted that while managers 300 and 400 are described as processes, one or more of the sub-processes within any of the managers 300 and 400 may be fully implemented within hardware or executed within an application-specific integrated circuit (ASIC), that is, an integrated circuit that is customized for a particular task.

Figure 3:
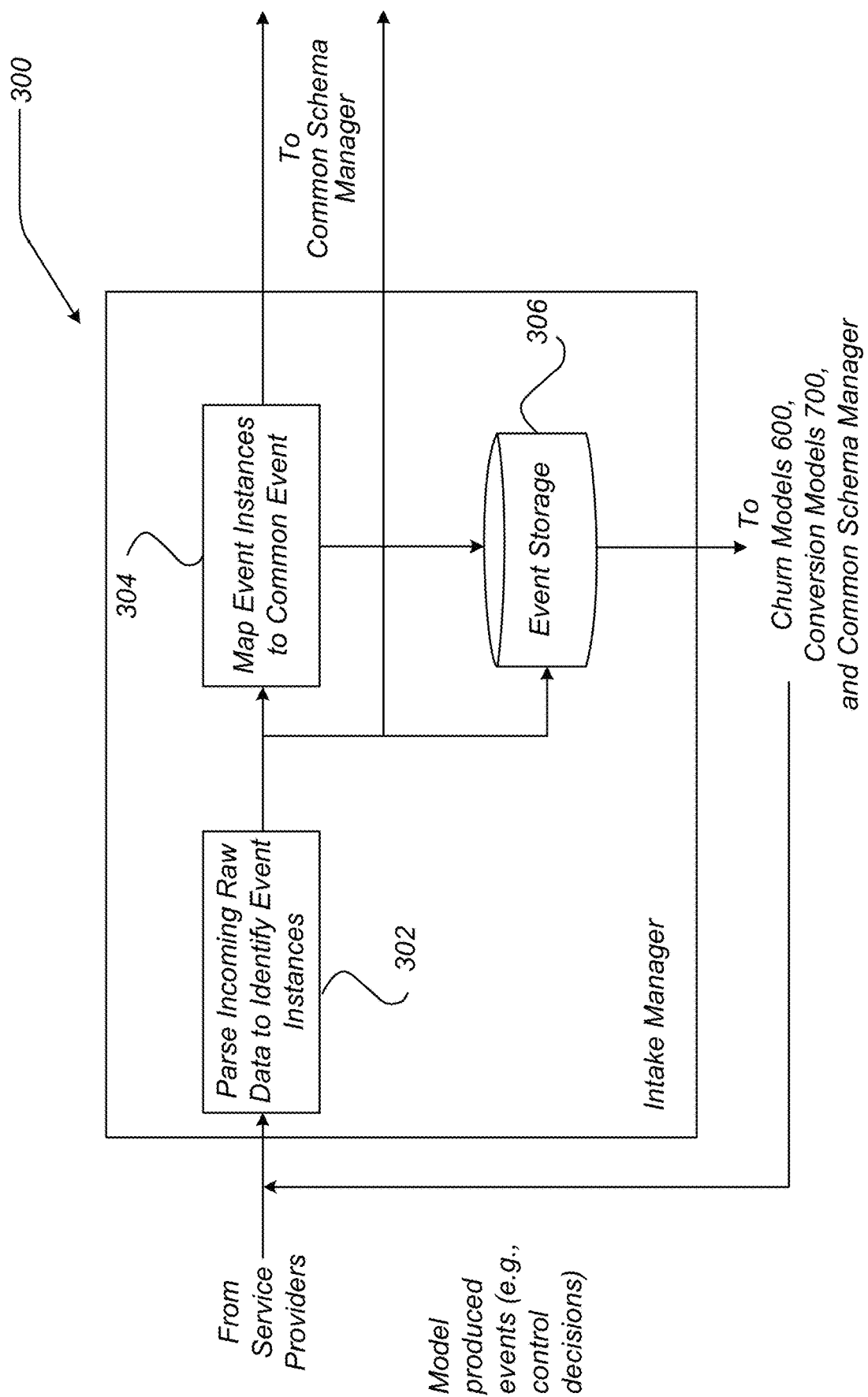
FIG. 3 shows one example of an intake manager (IM), configured to provide a framework for accessing raw or model produced data files, in accordance with an example of the disclosure.

FIG. 3 shows one example of an intake manager (IM) 300 configured to provide a framework for accessing raw or model produced data files that may include transactional and/or behavioral data for various entities, including users of a service provider.

IM 300 may receive data as described above at a specified interval to produce a real-time model and to generate the prediction score. In some examples, data may be received daily, hourly or even shorter intervals to generate the prediction score. IM 300 may then employ a sub-process 302 to parse incoming data to identify event instances, locate new files, and perform any copying of the files into various storage locations and registries, such as event storage 306. Parsing may include, among other actions, matching one or more events from a given file to one or more entities, extracting event types, event instances, or the like. Any data translations or registrations may also be performed upon the incoming data at sub-process 302.

The data is then provided to sub-process 304, where various event instances may be identified and mapped to common events. For example, in one example, a service provider may identify events that occurred during the specified interval. Sub-process 304 may examine the incoming event instances, and so forth, to generate common events with common terminology, form, formats, and so forth, to be provider agnostic.

Figure 4:
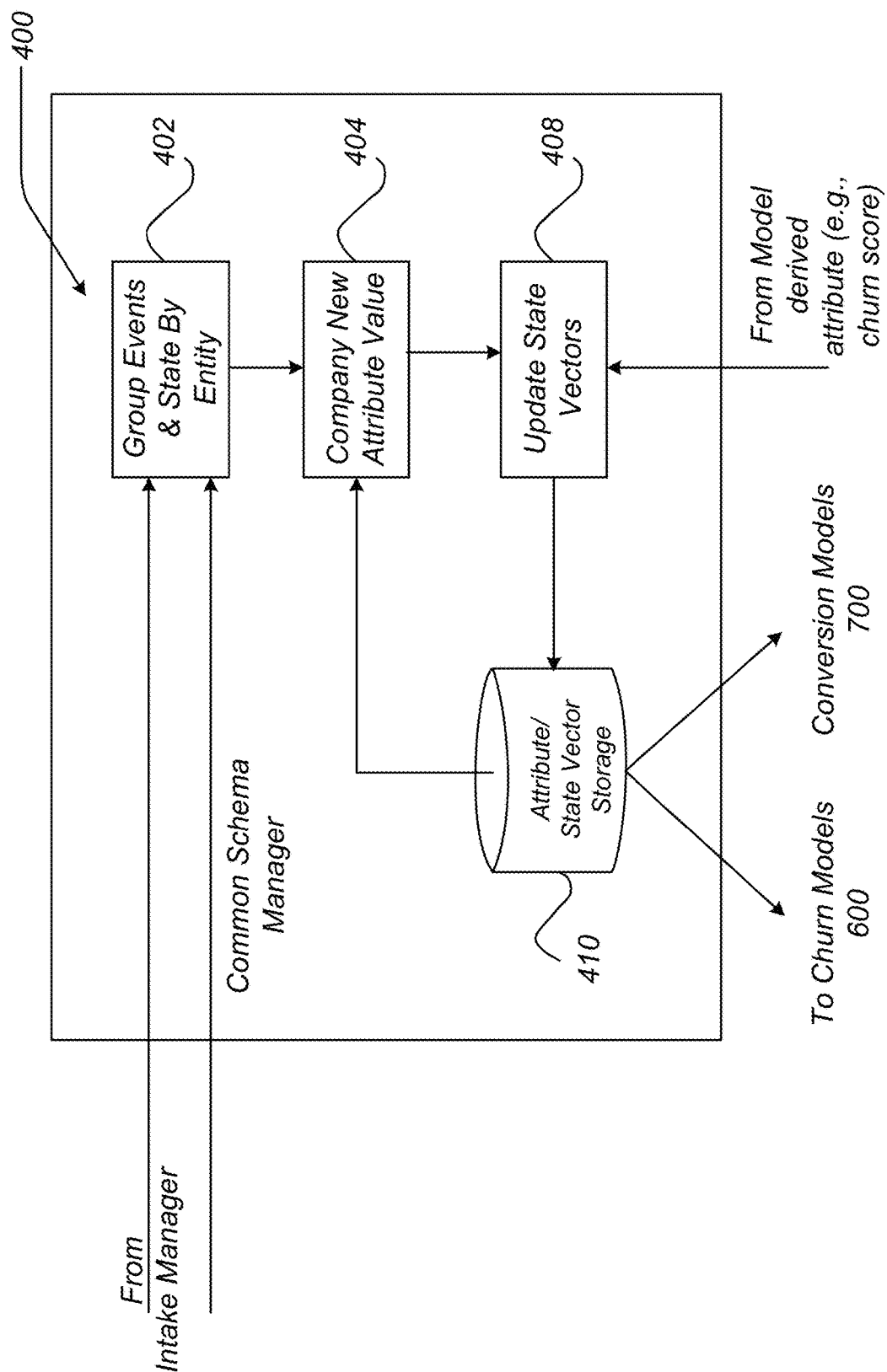
FIG. 4 shows one example of a Common Schema Manager (CSM) usable within the contextual modelling platform (CMP) of FIG. 2, in accordance with an example of the disclosure.

FIG. 4 shows one example of a Common Schema Manager (CSM) 400 that may be used within the CMP 357 of FIG. 2. It should be noted that CSM 400 may include more or less components than those shown in the figure. However, those components shown are sufficient to practice the disclosed innovations.

The user may be defined as an entity, where attributes of the user are considered. The user may provide data; the data provided by the user is otherwise referred to as "user-submitted data." In some examples, the user is provided an onboard survey, where the user provides information used to determine attributes. For example, the user may submit the name of business, the business type, whether the user is the business owner, etc. Other attributes may include the status of the user, the age of the user's membership/trial, the subscribed platform, the user engagement on the user device within a predetermined time interval, the status of the user's device (web interface or mobile device), etc. For example, user engagement may include the user's engagement with the platform within the predetermined time interval after the initial signup on the platform, and what was the type of engagement.

Some types of engagement can include the user connecting a separate account (i.e., bank account) to the provider's platform, the user categorizing a transaction, the user manually adding data (i.e., an expense), the user enabling a feature of the platform (i.e., mileage tracking), the user categorizing data (i.e., a trip), the user requesting assistance, technical help, or querying a self-help assistance guide provided by the provider's platform, etc. It is noted that while many attributes of an entity may be directly obtained from the raw data, or as a result of actions performed within IM 300, there are some attributes that may also be computed or otherwise derived. CSM 400 therefore is further configured to compute attributes for entities. CSM 400 may also update computations given current state data, or the like, to compute a new state. CSM 400 may also support the ability to include aggregate values into computations, as well as compute recursive data, convert some types of data into other formats for use within subsequent computations, or the like.

As shown in FIG. 4, CSM 400 receives data from IM 300 at sub-process 402, where the received data may be grouped by entity. Thus, events, state data, and so forth may be organized by entity in one example. The results may flow to sub-process 404 where derived attributes may be computed and provided to sub-process 408 to store and/or update state vectors for entities in attribute/state vector storage 410.

Sub-process 404 may compute a variety of attributes, including, but not limited to, recursive independent attributes, attributes having complex forms, attributes that may be computed from data provided by predictive models, user clusters, including time series clusters, usage histogram clusters, cluster scoring, or the like. Computed attributes may also include values constituting of a category, cyclical values, or the like. In any event, the computed attributes may be used to update state vectors for an entity or the like, which may be performed by sub-process 404. The updated state vectors may be extracted by sub-process 404 from the data stores and provided to sub-process 408. While shown within CSM 400, attribute/state vector storage 410 may reside in another location external to CSM 400. However, attribute/state vector storage 410 is illustrated here merely to show that data may be used and/or provided by different sub-processes of CSM 400. For example, among other things, event storage 306 and/or state vector storage 410 may provide various event data requirements used to provide data for initialization of an attribute or to derive attributes that might be computed, for example, from 'scratch', or the like. Attribute/state vector storage 410 may also store and thereby provide attribute dependency data, indicating, for example, whether an attribute is dependent upon another attribute, whether a current dependency state is passed to attributes at a computation time, whether dependencies dictate a computation order, or the like. Output of CSM 400 may flow, among other places to Churn Models 600 and Conversion Models 700 of FIG. 2, and conversely, those components may provide updated attribute information to sub-process 408 in order that it may be added to attribute/state vector storage 410.

As noted, Churn Models 600 primarily (although not exclusively) receives data after it has been mapped to the common schema. The data available in the event storage 306 or attribute/state vector storage 410 contains a wide range of information about individual accounts (e.g., a date an account was established) and usage events associated with that account (e.g., number of bank accounts added, third party add-on subscriptions).

One example of a Contextual Model disclosed herein is a dynamic state-spacing modeling realized within an ensemble learning method model (ELMM) framework. An example ELMM includes a random forests or random decision forests model used for classification, regression and other tasks. The random forests model operates by constructing a multitude of decision trees at training time and outputting the class that is the mode of the classes (classification) or mean prediction (regression) of the individual trees. An ELMM is a model for producing sequences with certain statistical properties. The purpose for the churn model is to produce an ELMM that produces sequences typical of churners and for non-churners. From the ELMM churn model, a list of predicted churners and a list of predicted non-churners are generated. For example, the model might generate a 1 or a 0 for a particular user. In some examples, 1 indicates a prediction of churn, and 0 indicates a prediction of non-churn. Similarly, a purpose for this example of the conversion model is to produce an ELMM that produces sequences typical of converters and non-converters. From the ELMM conversion model, a list of predicted converters and a list of predicted non-converters are generated. For example, the model might generate a 1 or a 0 for a particular user. In some examples, 1 indicates a prediction of conversion, and 0 indicates a prediction of non-conversion. To determine if a user is a loss risk, a behavioral sequence is constructed for that user and evaluated with respect to the respective ELMM to determine which is a more likely result of the sequence.

One example may include more than one ELMM because a churn/no-churn ELMM may be trained for different disjoint segments of the overall population, as shown in FIG. 3.

Figure 5:
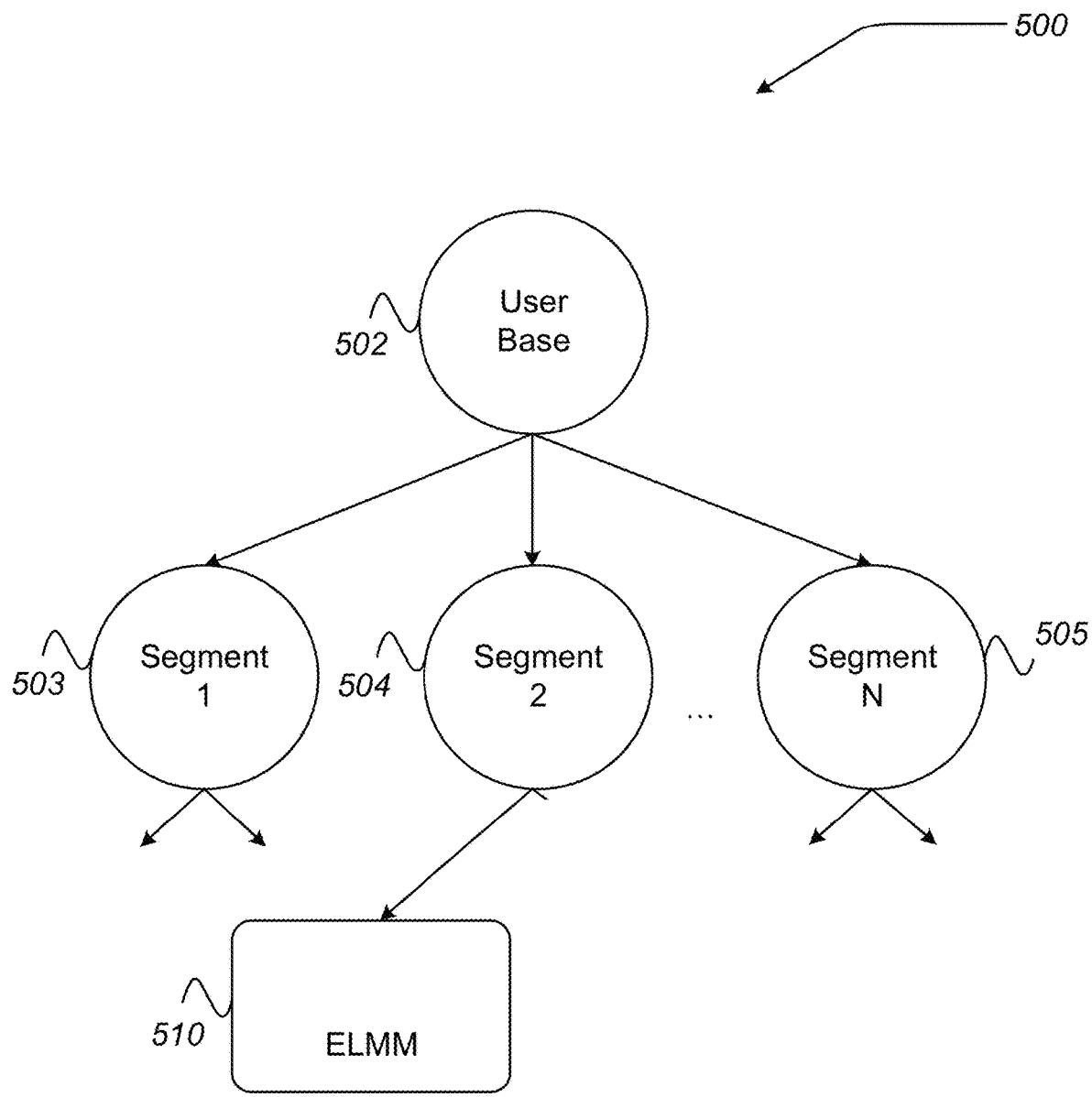
FIG. 5 illustrates one example of an ensemble learning method model (ELMM) hierarchy derived from a segment that is selected from a user base, in accordance with an example of the disclosure.

FIG. 5 illustrates one example of an ELMM hierarchy 500 derived from a segment 504 that is selected from user base 502. As shown, ELMM 510 may be generated for segment 504. It is noted that similar ELMMs may also be generated for any or all other segments, that is, 503, 505, and others that have been omitted from FIG. 5 for clarity. Moreover, segment definitions take the form of criteria on users, e.g., a tenure range, rather than a static list of users since the user base itself is dynamic: users join or leave a segment simply due the creation of new accounts and the termination of existing accounts with the provider.

Further, there may be multiple ELMMs for any given segment of the subscriber base because the ELMM may be highly parameterized, for example, allowing for multiple definitions of churn. In such cases, a subscriber would receive multiple churn scores, one from each variant. Moreover, it can be useful to run multiple variants of the ELMM in production because there are multiple uses for its output, including, but not limited to automated decisioning, churn model performance monitoring, or the like. In any event, the ELMM hierarchy may be used to track the individual ELMM for multiple segments of the total subscriber base for a service provider.

Figure 6:
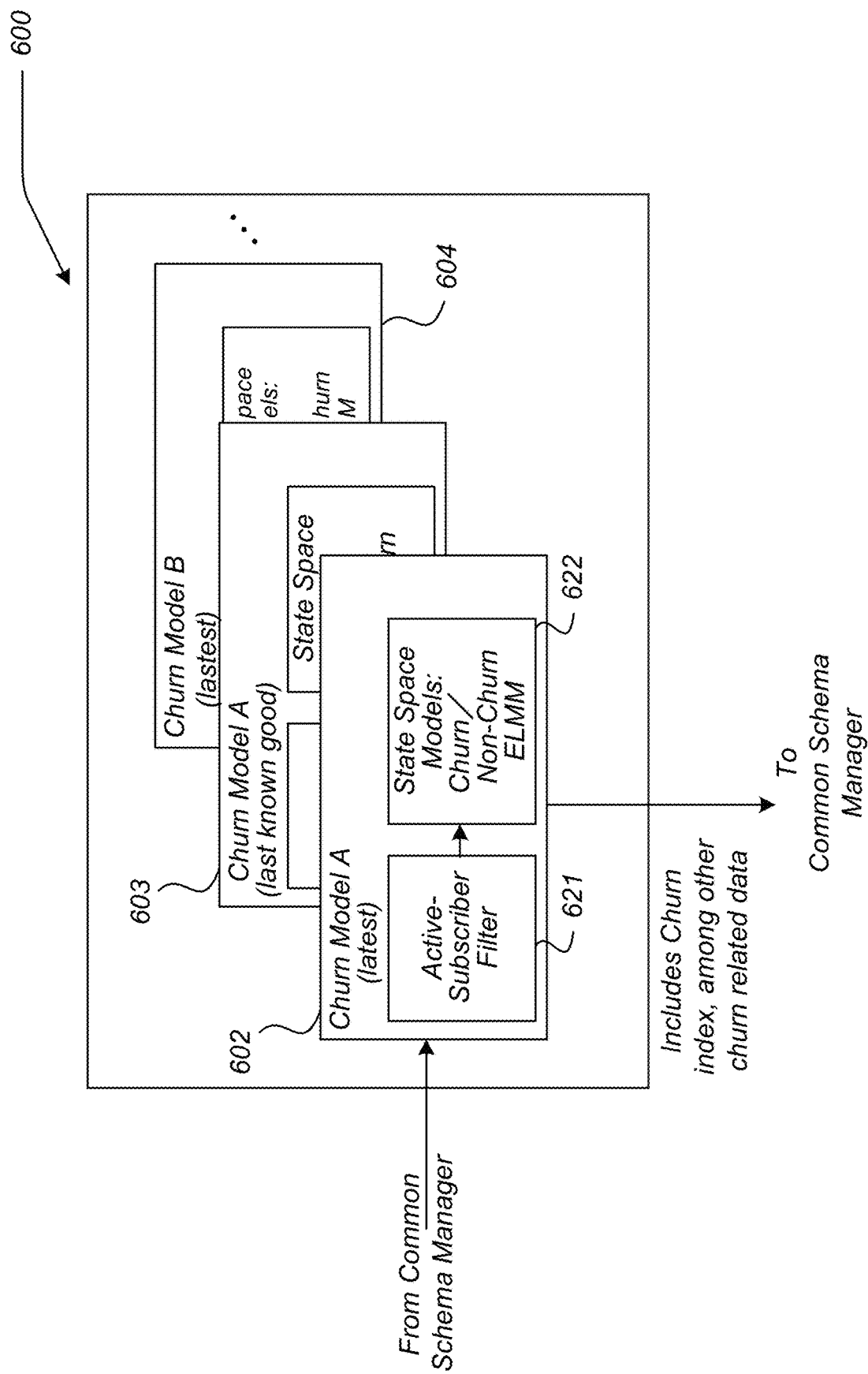
FIG. 6 shows one example of Churn Models useable with the CMP of FIG. 2, in accordance with an example of the disclosure.

At least one ELMM may also be configured for application to subscribers in a single segment by introducing variants of parameter settings. This allows, for example, short-term and long-term churn risk to be assessed separately. In this instance, multiple variants of the model may produce separate churn scores for each subscriber (one per variant). Further, the Churn Models may be used to track an ELMM for multiple versions of the same (or nearly the same) segment and parameter settings. In some examples, multiple variants of the model may produce separate churn scores for each subscriber (one per variant). The set of Churn Models (individual, hierarchical, variants, and versions) is shown in FIG. 6, discussed in detail below.

To determine whether churn risk has increased, the prediction is generated from multiple different machine-learning (ML) models dynamically based on a user's lifetime in the product. Each of the models is operable for users who have stayed with the product for different lengths of time.

Machine learning is a field of study that gives computers the ability to learn without being explicitly programmed. Machine-learning explores the study and construction of algorithms, also referred to herein as tools, which learn from existing data and make predictions about new data. Such machine-learning tools operate by building a model from example training data in order to make data-driven predictions or decisions expressed as outputs or assessments (e.g., loss risks). Although example examples are presented with respect to a few machine-learning tools, the principles presented herein may be applied to other machine-learning tools.

The disclosed ELMM is based on a sequence of actions undertaken by a subscriber or trial user (collectively referred to as "user"). In one example, the sequence includes measurements of user actions over a predetermined time interval. The subscriber actions are defined by a select set of attributes either drawn directly from the common schema or values derived from basic measurements in the common schema. The data may be represented on a daily basis, in one example, to provide a high resolution for which the full range of reported data is typically available. However, higher resolution (e.g. every 5 minutes) or lower resolution (e.g., weekly) representations could also be used (though in the limit significant coarsening reduces the state-space modeling approach to one equivalent to standard techniques).

FIG. 6 shows one example of Churn Models 600 that may be used with the CMP 357 of FIG. 2. As shown, Churn Models 600 may include a models 602-604. Each model 602-604 may include sub-components. Churn models 602-604 may include more or less sub-components than those shown in FIG. 6. However, the sub-components shown are sufficient to disclose an illustrative example for practicing the subject disclosure.

As shown in FIG. 6, for example, Churn models 602 includes an active-subscriber filter 621 and state-space model 622. Active-subscriber filter 621 represents a filtering component to select subscribers of interest, while the state-space model 622 represents a pattern recognition component based on a state-space behavioral model. In one example, state-space model 622 may be implemented within the ELMM framework. The state-space model 622 is trained and calibrated using historical data, as discussed further below.

Once ready, the state-space model 622 is deployed to a production system. As baseline subscriber behavior evolves, the state-space model 622 may be retrained. In some examples, the retraining may be based on monitoring the performance of the production system, for example, the accuracy of the predictions. However, retraining may be based on other criteria, including a schedule, detected changes in the baseline subscriber behavior, or any of a variety or combination of other criteria.

As shown in FIG. 6, in one example, a churn model is only applied to active subscribers. It may be unnecessary to apply the model to subscribers who did not renew their subscription base membership or have cancelled their subscription base membership. Furthermore, in some examples, it is beneficial to retain inactive subscribers, as the inactivity generally results in higher churn probability. For example, a user associated with a seasonable business, might not operate in a particular time of the year. The platform would observe no activity from the user, yet the user may maintain their subscription base membership because they expect future activity. The ELMM model would detect this annual pattern and determines that other users associated with similar businesses may also exhibit periods of inactivity while maintaining an active subscription.

Churn Models shown in FIG. 6 indicate that churn modeling is based on a state-space model of subscriber behavior, as illustrated by the state-space model 622. This is a major distinction between the disclosed approach and traditional models, which represent subscriber behavior as a non-sequential set of characteristics. The distinguishing factor is that a state-space model explicitly represents the sequence of events. For example, if a subscriber has not entered account information by day 20, a state-space model would capture this order of events, while traditional models would likely lose this information. A traditional modeling approach may only retain this information, but only through an encoding of sequential behavior in a "flat" format. Such a process requires expensive feature selection via either an ad hoc determination or an exhaustive automated approach, or, if feature selection is neglected, threatens model quality degradation due to the large number of likely encodings. The state-space approach captures these important relationships by design.

Figure 7:
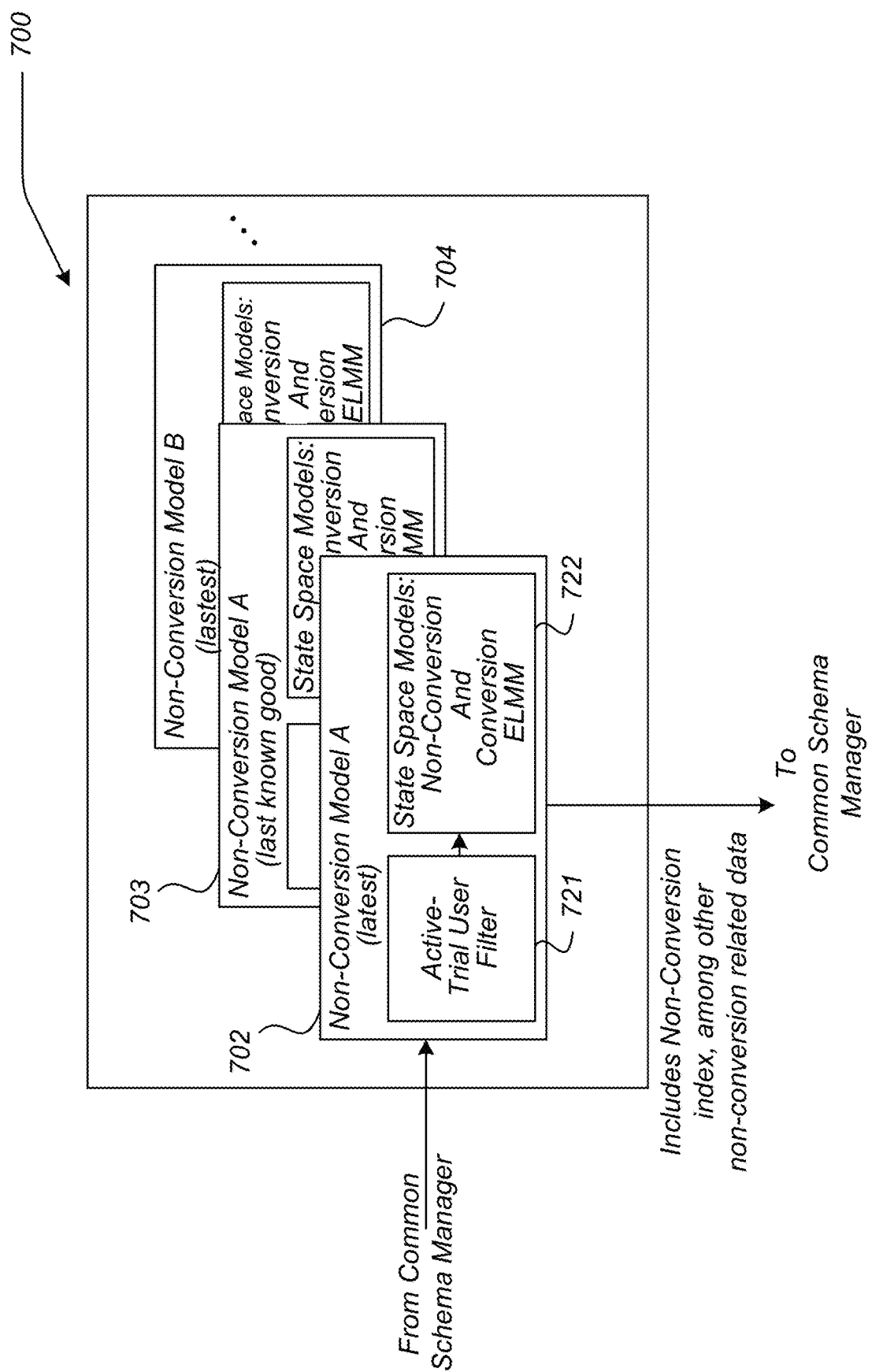
FIG. 7 shows one example of Conversion Models useable with the CMP of FIG. 2, in accordance with an example of the disclosure.

FIG. 7 shows one example of Conversion Models 700 that may be used with the CMP 357 of FIG. 2. As shown, Conversion Models 700 may include a plurality of models 702-704. Each of Conversion Models 702-704 may include a plurality of sub-components. Conversion Models 702-704 may include more or less components than those shown in FIG. 7. However, the components shown are sufficient to disclose an illustrative example for practicing the subject disclosure.

As shown in FIG. 7, for example, Conversion Models 702 includes active-subscriber filter 721 and state-space model 722. Active-subscriber filter 721 represents a filtering component to select subscribed users of interest, while the state-space model 722 represents a pattern recognition component based on a state-space behavioral model. In one example, the state-space model 722 may be implemented within the ELMM framework. The models are trained and calibrated using historical data. In some examples of the churn ELMM, the churners are filtered daily. For conversion ELMM, the subscribers are filtered daily.

Once ready, the state-space model 722 is deployed to a production system. As baseline trial user behavior evolves, the state-space model 722 may be retrained. In some examples, the retraining may be based on monitoring the performance of the production system, for example, the accuracy of the predictions. However, retraining may be based on other criteria, including a schedule, detected changes in the baseline trial user behavior, or any of a variety or combination of other criteria.

As shown in FIG. 7, in one example, a conversion model is only applied to active trial users. It may be unnecessary to apply the model to trial users to trial users who have already converted, or trial users who have canceled their trial membership. Conversion Models shown in FIG. 7 indicate that conversion modeling is based on a state-space model of trial user behavior, as illustrated by state-space models 722. This is a major distinction between the disclosed approach and traditional models, which represent trial user behavior as a non-sequential set of characteristics. The distinguishing factor is that, in accordance with the disclosed principles, a state-space model explicitly represents the sequence of events.

When constructing a state-space model, the user's intention to churn, or intention to subscribe is not typically something that can be measured directly. It is not captured explicitly in a provider's data. Instead one expects to observe the side effects of a user's state, e.g., uploaded information, enrolling into various platforms, and the like. User state is therefore considered to be "hidden" and is deduced from a subscriber's behavior. Moreover, a user's state may change over time, necessitating accurate deduction of state using the latest available behavioral data.

As mentioned herein, the Churn/Conversion Models may be built upon the ELMM framework. Machine learning frameworks can be used to rank the importance of variables in a regression or classification problem in a natural way. For example, Shapley can be implemented for feature importance analysis in a churn model. For each feature, a shap value is calculated for every feature value. The feature value is the average of this feature value's marginal contribution across all permutations of other features. Shapley method is just one of several algorithms that can be implemented. In various example examples, different machine-learning tools are used. For example, Multinomial Naive Bayes (MNB), Support Vector Machines (SVM), multinomial Logistic Regression (LR), Random Forest (RF), Gradient Boosted Trees (GBT), neural networks (NN), matrix factorization, and other tools may be used for generating loss risk models. The specific model is chosen based on the use case, such as random forests modeling being chosen as a preferred method to handle sparse data.

Figure 8:
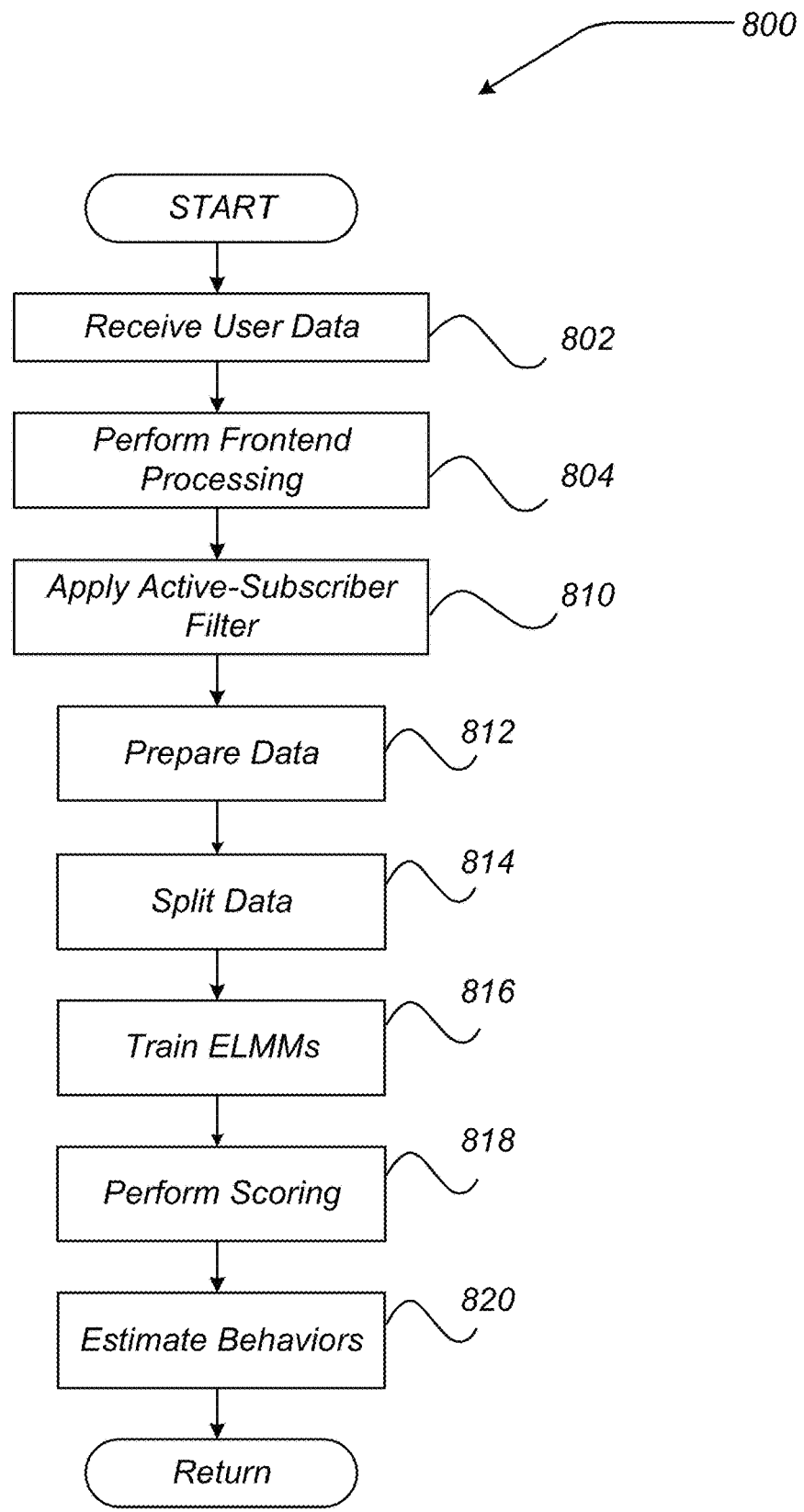
FIG. 8 shows one example of a process flow useable to train churn and non-conversion ELMMs, in accordance with an example of the disclosure.

The operation of certain aspects of the Churn Models of FIG. 6 and Conversion Models of FIG. 7 are now described with respect to the process 800 illustrated in FIG. 8, which may be used to train churn and non-conversion ELMMs. Process 800 of FIG. 8 may be implemented within any one or more of the Churn Models 602-604 of FIG. 6 or the Conversion Models 702-704, which operate within CMP 357 of FIG. 2. The process 800 may be configured as a computer implemented method for determining a loss risk based on a user's sequence of behaviors. The process 800 may be performed on a computing device and executed by a processor or performed within a computing system.

Process 800 may begin at block 802, where user data is accessed. The user data may be accessed from a representative set of a service provider's data set. In one example, the received data is raw data from the service provider's data set (though data may also be received from other sources). The accessed user data can include at least user-submitted data and user-derived data based on the user's sequence of behaviors. The data may be accessed at a predetermined time interval to produce a real-time loss risk value and to generate a prediction score.

Processing then moves to block 804, where various frontend processing may be performed on the user data, including those actions discussed above in conjunction with FIG. 3-4. Specifically, the raw data may be parsed and mapped to a common schema. Frontend processing may also include mapping a user to user base segments where the user base has been partitioned as described in conjunction with the description of FIG. 5.

Before performing training with the data (or later performing the operational process 900 of FIG. 9), a number of data preparation steps may be performed. The same data preparation steps (including active subscriber filtering) may be carried out for both model training and use of the model in operation, as discussed below in conjunction with FIG. 9.

Data preparation includes 1) selecting active users with the active-user filter, 2) constructing first sequential behavior activities for the first active users, and 3) determining a churn/conversion label for model training and (once enough time passes for it to become available) operational model performance monitoring. For model training and calibration, the prepared data may be split into independent sets for training, testing, and validation.

In any event, process 800 flows next to apply the active-subscriber filter, at block 810. That is, given a time window (e.g., within a one-day or 24-hour period), the filter identifies all users who meet the chosen definition of active users.

Processing then proceeds to block 812, where further data preparation actions are performed including constructing first sequential behavior activities. The first sequential behavior activities are data used for model training and (once enough time passes for it to become available) operational model performance monitoring. At block 812, daily time series of subscriber behavior are constructed from common schema attributes. Several considerations are made while constructing the sequences. One such consideration includes selecting the features of interest. To improve model quality and robustness (in part by balancing the amount of available training data and model complexity) only a few select common schema attributes are used. To determine which features to use, many potential models are constructed and tested. The best performing models, and the features associated with them, are selected. The determination of "best" does not imply simply selecting the features that appear in the single highest performing candidate, but in selecting features common to several of the highest performing models. That is, features are selected for both absolute performance and robustness.

Depending on the feature in question, it may be desirable to aggregate several discrete events in order to map the data to a daily sequence used by the model.

The churn model and conversion model are more than pattern matching tools. The resulting ELMMs are also used to directly recommend future user actions. Moreover, in some examples, an ELMM is computed for subscribers who did not churn. Similarly, an ELMM is computed for trial users who later converted, and trial users who did not. The label sequence is used to determine which users belong to which group.

To determine which subscribers are churners in historical data, the activity level is computed from the label sequence in a similar manner as used in the active-subscriber filter. "Churners" are those subscribers who did not renew their subscription base membership within a certain period, cancelled their subscription base membership within a certain period, or whose activity level meets certain criteria, for example, is below a set threshold of subscribers during the label sequence interval. The churners are subscribers who were previously active users (they passed through the active-subscriber filter) but are no longer active.

In contrast, to determine which trial users are non-converters in historical data, the converters are subscribers who have converted their trial membership to full membership.

While the pattern matching approach includes splitting users into groups of churners, non-churners, converters, or non-converters, if sufficient data is available, greater accuracy can be achieved by subdividing the general population into multiple groups. For example, different platform subscription can substantially change the utility of the provided service and therefore the decision processes of users. For example, the service provider may provide multiple platforms available to a user (i.e., Quickbooks Essentials®, QuickBooks Plus®, etc.). Instead of simply creating one ELMM for general churners and on for general non-churners, separate ELMMs can be trained for subscribers associated with each individual platform offered by a service provider. The general procedure remains unchanged: ELMMs for each group are trained, and the classification of a new behavioral sequence is determined by finding which of all the ELMMs is most likely to have produced the sequence.

In any event, upon preparing the data at block 812, process 800 proceeds to block 814 where data may be split into three non-overlapping sets: train, test, and validate sets.

In another example, the data may be split into three non-overlapping sets: train, validation (for cross-validation), and test sets.

The training set contains examples of churners, non-converters, non-churners, and converters. It is not necessary that the proportion of churners/non-converters to non-churners/converters be the same in the training set as in live data. For example, the training set may consist of approximately half churners and half non-churners.

The test set is used to get an unbiased estimate of model performance (since the training and validation sets were used to determine model settings). It should also contain the natural proportion of churners/non-converters to non-churners/converters.

Process 800 then proceeds to block 816, where the ELMM framework is employed to train the model. The training set is used to train churn and conversion ELMMs. Process 800 continues at block 818, where scoring and classifying of sequences for the user framework is performed. To test the model and use it in operation, it is necessary to have a method to score sequences given a model. Several approaches may be employed. Once the likelihood that a model produced a given behavior sequence is computed, the task is predicted. The task may be predicted by computing the likelihood that a behavioral sequence was produced by the churn/non-conversion ELMM. The likelihood that a behavioral sequence was produced by the non-churn/conversion ELMM is computed. The two values are compared to predict that the subscriber is a churn risk if the churn/non-conversion ELMM likelihood is greater than the non-churn/conversion ELMM likelihood.

Although typically, the sequence length for the churn/non-converters and non-churn/converter ELMMs is identical, it is relevant to account for sequence length when comparing likelihoods from different ELMMs. Furthermore, a normalization scheme may be used to account for a systematic error introduced by differences in sequence length (if any) between the churn/non-converters and no-churn/converter ELMMs.

Continuing at block 820, the operating point is selected for model calibration and then used for estimating a user's sequence of behaviors. In other words, the accessed data is processed to compare the user's sequence of behaviors to a trained ELMM. The offset is a relevant parameter. For example, if it is large (and positive) only sequences that are much more likely to have come from the non-conversion ELMM are identified as non-conversion risks. The value is selected during model testing, this is the calibration step and is distinct from model training (at block 816). Choosing the offset value does not modify the ELMMs themselves, rather, this act is to set the operating point, i.e., the threshold which is employed in order to declare a user a loss risk.

The predicted performance may be stored, in particular, for use later on when evaluating the performance of the model in production (e.g., as part of process 918 in FIG. 9). Also, operational data should be statistically similar to data used during training (if it is not, it may be necessary to retrain the model) so a record of the training data sufficient to carry out such comparison may be stored. Process 800 may then return to a calling process, after block 820.

Figure 9:
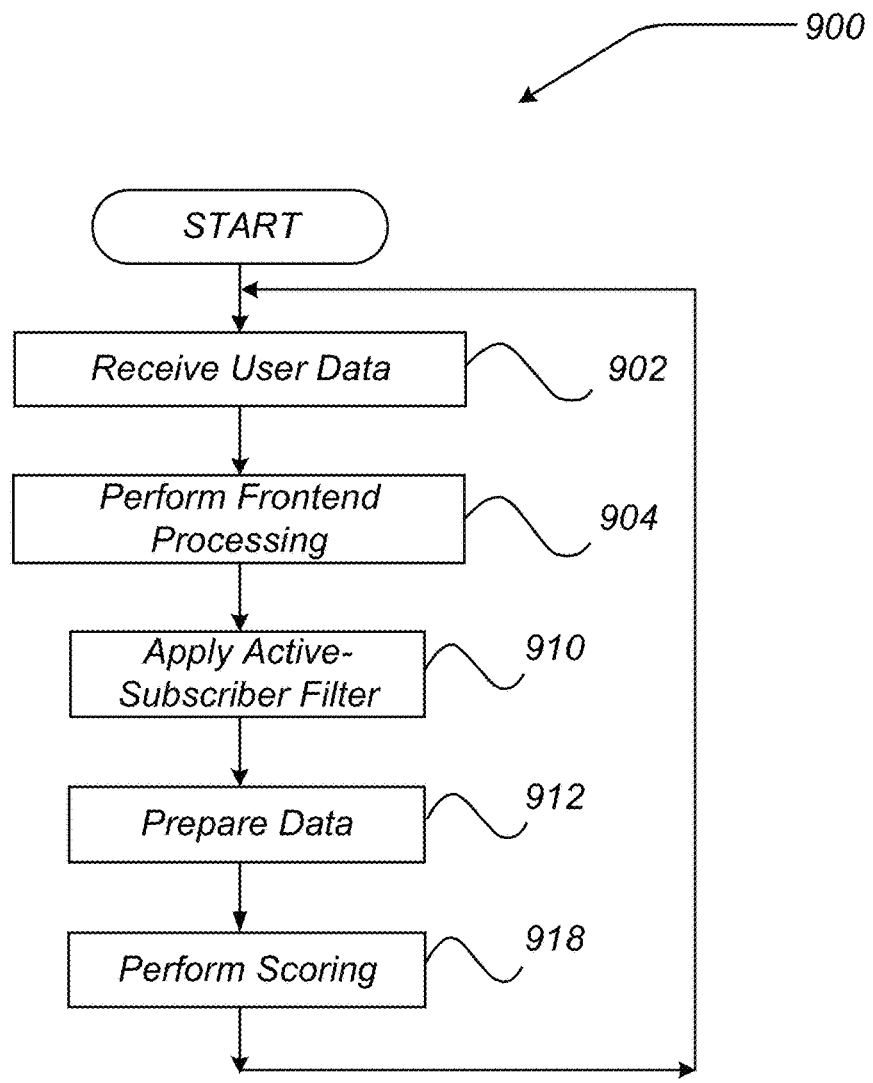
FIG. 9 shows one example of a process flow useable in live production of the trained ELMMs.

FIG. 9 shows one example of a process flow useable in live production of the trained ELMMs. It is noted that many of the actions performed during the production use of the ELMM models are substantially similar to those performed to train the models. However, several actions performed during training need not be performed during production. The process 900 may be configured as a computer implemented method for determining a loss risk based on a user's sequence of behaviors. The process 900 may be performed on a computing device and executed by a processor or performed within a computing system.

Process 900 is an example where a trained model is used in production to determine the current churn risk for subscribers or non-conversion risk for trial users (collectively referred to as loss risk value). The model results are then appended to the common schema.

Thus, process 900 begins at block 902, where raw customer data is received, as discussed above in conjunction with block 802 of FIG. 8. Process 900 then continues at block 904, where frontend processing substantially similar to that of block 804 of FIG. 8 is performed. At block 910, the active subscriber filter performs actions substantially similar to those of the active-subscriber of FIG. 8. That is, given a start and end date, the filter identifies all users who meet the chosen definition of active.

Process 900 continues at block 912, where the preparation of the data is also substantially similar to those actions described above in conjunction with FIG. 8. That is preparation includes for example, building sequences of discretized data, performing normalization, and so forth, however, no churn/non-conversion labels are computed. Indeed, this is not possible during the period in which a churn prediction has value: before the point of churn. In any event, churn labels are not required in production in order to predict churn risk. At block 918, since the ELMM models are already trained and tuned, the models are retrieved and used to perform scoring of the users.

Specifically, the accessed data is processed to compare the user's sequence of behaviors to a trained ELMM. A loss risk value for the user is generated based on the user's sequence of behaviors and the trained ELMM. The loss risk value is sent to a data repository (e.g., SaaS data source 202 or external data source 203) to be included in previous first sequential behavior activities of multiple first users of a service provider.

Rather than a single churn model (such as model 602 of FIG. 6), many models (e.g., models 602-604 of FIG. 6) may be available in production. In some examples, a model may be retrained on new data, so some current and some previous versions of one model may be available.

Process 900 may continue to receive customer data at block 902 and repeat the steps discussed above. While process 900 appears to operate as an "endless" loop, it should be understood that it may be executed according to a schedule (e.g., a process to be run hourly, daily, weekly, etc.) and it may be terminated at any time. Moreover, process 900 may also be configured to perform asynchronously as a plurality of process 900s. That is, a different execution of process 900 may be performed using different ELMMs at block 918, using different filter criteria, and/or even based on the service provider's user base.

It will be understood that each block of the processes, and combinations of blocks in the processes discussed above, can be implemented by computer program instructions. These program instructions may be provided to a processor to produce a machine, such that the instructions, which execute on the processor, create means for implementing the actions specified in the block or blocks. The computer program instructions may be executed by a processor to cause a series of operational steps to be performed by the processor to produce a computer-implemented process such that the instructions, which execute on the processor to provide steps for implementing the actions specified in the block or blocks. The computer program instructions may also cause at least some of the operational steps shown in the blocks to be performed in parallel. Moreover, some of the steps may also be performed across more than one processor, such as might arise in a multiprocessor computer system. In addition, one or more blocks or combinations of blocks in the illustration may also be performed concurrently with other blocks or combinations of blocks, or even in a different sequence than illustrated without departing from the scope or spirit of the subject innovation. Accordingly, blocks of the illustration support combinations of means for performing the specified actions, combinations of steps for performing the specified actions and program instruction means for performing the specified actions. It will also be understood that each block of the illustration, and combinations of blocks in the illustration, can be implemented by special purpose hardware-based systems, which perform the specified actions or steps, or combinations of special purpose hardware and computer instructions.

What is claimed is:

1. A computer implemented method for determining a loss risk based on a user's sequence of behaviors, said method being performed on a computing device and executed by a processor, said method comprising:

periodically accessing data at a data repository, the accessed data comprises at least user data including user-submitted data and user-derived data based on the user's sequence of behaviors;

repeatedly training an ensemble learning method model (ELMM) that comprises one or more machine learning models to generate a trained ELMM that uses dynamic state-spacing modeling to represent information about sequential behavior activities of users of a service provider as the user moves through different predetermined time intervals, wherein the trained ELMM is repeatedly trained by monitoring its performance based on an accuracy of its predictions, at least one of the one or more machine learning models being a Support Vector Machine (SVM), Gradient Boosted Tree (GBT), or Neural Network (NN);

separating first users of the service provider into multiple segments for the different predetermined time intervals to build individual behavioral models for each of the multiple segments, wherein the multiple segments form a hierarchy that is used to track the user through the different predetermined time intervals and the multiple segments of a total subscriber base for the service provider, and selecting, for the user, one of the multiple segments to which the user belongs while deselecting a previous one of the multiple segments, and using the individual behavioral models for the selected one of the multiple segments for the user to train the trained ELMM;

processing the accessed data to compare the user's sequence of behaviors to the trained ELMM;

generating a loss risk value for the user based on the user's sequence of behaviors and the trained ELMM; and sending the loss risk to the data repository to be included in previous first sequential behavior activities of the first users of the service provider.

2. The method of claim 1, wherein the user is a subscriber, the loss risk comprises churn risk, and said method comprises terminating use of a service provider platform of the first users of the service provider after the first sequential behavior activities.

3. The method of claim 1, wherein the user is a subscriber, the loss risk comprises churn risk, and said method comprises resuming use of a service provider platform of the first users of the service provider after the first sequential behavior activities.

4. The method of claim 1, wherein the user is a trial user, the loss risk comprises non-conversion risk, and said method comprises not converting trial membership into subscription base membership of a service provider platform of the first users of the service provider after the first sequential behavior activities.

5. The method of claim 1, wherein the user is a trial user, the loss risk comprises non-conversion risk, and said method comprises converting trial membership into subscription base membership of a service provider platform of the first users of the service provider after the first sequential behavior activities.

6. The method of claim 1, further comprising accessing the data at a predetermined time interval to produce a real-time loss risk value and to generate a prediction score.

7. A system for determining a loss risk based on a user's sequence of behaviors, the system comprising:
 a non-transitory data storage device; and
 one or more special purpose computer devices that access and store data on the data storage device and employ at least one processor to perform actions, including:
 periodically accessing data at a data repository, the accessed data comprises at least user data including user-submitted data and user-derived data based on the user's sequence of behaviors;
 repeatedly training an ensemble learning method model (ELMM) that comprises one or more machine learning models to generate a trained ELMM that uses dynamic state-spacing modeling to represent information about sequential behavior activities of users of a service provider as the user moves through different predetermined time intervals, wherein the trained ELMM is repeatedly trained by monitoring its performance based on an accuracy of its predictions, at least one of the one or more machine learning models being a Support Vector Machine (SVM), Gradient Boosted Tree (GBT), or Neural Network (NN);
 separating first users of the service provider into multiple segments for the different predetermined time intervals to build individual behavioral models for each of the multiple segments, wherein the multiple segments form a hierarchy that is used to track the user through the different predetermined time intervals and the multiple segments of a total subscriber base for the service provider, and selecting, for the user, one of the multiple segments to which the user belongs while deselecting a previous one of the multiple segments, and using the individual behavioral models for the selected one of the multiple segments for the user to train the trained ELMM;
 processing the accessed data to compare the user's sequence of behaviors to the trained ELMM;
 generating a loss risk value for the user based on the user's sequence of behaviors and the trained ELMM; and
 sending the loss risk to the data repository to be included in previous first sequential behavior activities of the first users of the service provider.

8. The system of claim 7, wherein the user is a subscriber, the loss risk comprises churn risk, and said method comprises terminating use of a service provider platform of the first users of the service provider after the first sequential behavior activities.

9. The system of claim 7, wherein the user is a subscriber, the loss risk comprises churn risk, and said method comprises resuming use of a service provider platform of the first users of the service provider after the first sequential behavior activities.

10. The system of claim 7, wherein the user is a trial user, the loss risk comprises non-conversion risk, and said method comprises not converting trial membership into subscription base membership of a service provider platform of the first users of the service provider after the first sequential behavior activities.

11. The system of claim 7, wherein the user is a trial user, the loss risk comprises non-conversion risk, and said method comprises converting trial membership into subscription base membership of a service provider platform of the first users of the service provider after the first sequential behavior activities.

12. The system of claim 7, further comprising accessing the data at a predetermined time interval to produce a real-time loss risk value and to generate a prediction score based on routine processing.

13. A computing system for determining a loss risk based on a user's sequence of behaviors, the system comprising:
 one or more processors; and one or more non-transitory computer-readable storage devices storing computer-executable instructions, the instructions operable to cause the one or more processors to perform operations comprising:
 periodically accessing data at a data repository, the accessed data comprises at least user data including user-submitted data and user-derived data based on the user's sequence of behaviors;
 repeatedly training an ensemble learning method model (ELMM) that comprises one or more machine learning models to generate a trained ELMM that uses dynamic state-spacing modeling to represent information about sequential behavior activities of users of a service provider as the user moves through different predetermined time intervals, wherein the trained ELMM is repeatedly trained by monitoring its performance based on an accuracy of its predictions, at least one of the one or more machine learning models being a Support Vector Machine (SVM), Gradient Boosted Tree (GBT), or Neural Network (NN);
 separating first users of the service provider into multiple segments for the different predetermined time intervals to build individual behavioral models for each of the multiple segments, wherein the multiple segments form a hierarchy that is used to track the user through the different predetermined time intervals and the multiple segments of a total subscriber base for the service provider, and selecting, for the user, one of the multiple segments to which the user belongs while deselecting a previous one of the multiple segments, and using the individual behavioral models for the selected one of the multiple segments for the user to train the trained ELMM;
 processing the accessed data to compare the user's sequence of behaviors to the trained ELMM;
 generating a loss risk value for the user based on the user's sequence of behaviors and the trained ELMM; and
 sending the loss risk to the data repository to be included in previous first sequential behavior activities of the first users of the service provider.

14. The computing system of claim 13, wherein the user is a subscriber, the loss risk comprises churn risk, and said method comprises terminating use of a service provider platform of the first users of the service provider after the first sequential behavior activities.

15. The computing system of claim 13, wherein the user is a trial user, the loss risk comprises non-conversion risk, and said method comprises converting trial membership into subscription base membership of a service provider platform of the first users of the service provider after the first sequential behavior activities.

* * * * *